SEQUENTIAL INFORMATION HOLOGRAM RECORD

Filed April 27, 1966

INVENTORS
HENDRIK J. GERRITSEN &
DAVID L. GREENAWAY
BY Edward J. Norton
ATTORNEY

United States Patent Office 3,545,834 Patented Dec. 8, 1970

3,545,834
SEQUENTIAL INFORMATION HOLOGRAM RECORD

Hendrik J. Gerritsen, Princeton Junction, N.J., and David L. Greenaway, Bassersdorf, Switzerland, assignors to RCA Corporation, a corporation of Delaware Filed Apr. 27, 1966, Ser. No. 545,754
Int. Cl. G02b 27/00
U.S. Cl. 350—3.5 3 Claims

ABSTRACT OF THE DISCLOSURE

A technique for recording and reading out a series of contiguous non-overlapping moving micro-holograms, such as may be used for recording and playing back the sound track of motion pictures, in a manner such that without the use of a shutter the respective positions of magnified reconstructed images of adjacent micro-holograms remain in non-overlapping contiguous relationship with respect to each other despite the occurrence of translational motion of the adjacent micro-holograms being read out in a direction transverse to the readout beam. This is accomplished by utilizing a convergent reference beam in recording each of the series of micro-holograms and then utilizing a divergent readout beam having a degree of divergence which is determined by the degree of convergence of the reference beam.

This invention relates to holograms and, more particularly, to a technique for recording and reading out sequential information, such as audio information, in the form of a series of holograms.

In general, a hologram consists of a recording on or in a recording medium of interference fringes resulting from interference between a reference beam obtained directly from a spatially coherent monochromatic light source, and information light flux from an object to be recorded which is illuminated by the same light source. Usually, the object information to be recorded, as well as the reconstructed image obtained upon readout of the hologram, is pictorial in nature. However, this need not be the case. For example, in accordance with the present invention, the object recorded in hologram form may comprise sequential information, such as successive portions of the sound track of a motion picture or other audio signal, for instance.

It is not practice to make a single hologram of the entire sound track of a complete motion picture. However, it is possible to make a series of separate contiguous holograms, each of which contains information pertaining to that portion of the sound track associated with a separate single frame of the motion picture. Thus, the sound track of a motion picture may be reduced to a series of holograms, each one of which corresponds to the portion of the sound track associated with a respective successive frame of a motion picture. This is highly desirable, since, due to the high information packing density of a hologram, the area of each of the series of holograms may be made no more than ten square millimeters and, in many cases, may be made even less than one square millimeter. Hereinafter, a hologram having an area of no more than ten square millimeters will be referred to as a "micro-hologram."

While it is possible to record sequential information in the form of a series of micro-holograms, reading out the series of micro-holograms to reproduce the sequential information in a desirable, usable form is a considerable problem. For instance, in the case of a motion picture sound track, it is necessary to reproduce a continuous audio output by reading out in succession each of the series of micro-holograms. This is no simple task, since to accomplish this properly, it is essential that the reconstructed image of each successive micro-hologram being read out in sequence be linearly scanned by photo-detector means in a manner such that there is neither any overlap nor any hiatus between the respective reconstructed images of successive micro-holograms. The present invention is concerned with a novel imaging system for recording and reconstructing micro-holograms which is capable of performing this difficult task.

More particularly, in accordance with the present invention, each of a series of contiguous separate micro-holograms is recorded with a convergent reference beam having a predetermined degree of convergence, rather than with a reference beam composed of at least approximately parallel rays of light as has been the case in the past. Each of the micro-holograms is then reconstructed by means of a divergent readout beam having a predetermined degree of divergence, rather than by a readout beam composed of at least approximately parallel rays of light as has been the case in the past. This permits each successive micro-hologram being read out to be linearly scanned in sequence by photo-detector means without any overlap or any hiatus between the respective reconstructed images of successive contiguous micro-holograms which are moved across the divergent readout beam.

It is therefore an object of the present invention to store sequential information in the form of a series of separate contiguous micro-holograms on a record.

It is a further object of the present invention to read out and reconstruct sequential information which has been stored in the form of a series of separate contiguous micro-holograms on a record.

These and other objects, features and advantages of the present invention will become more apparent from the following detailed description taken together with the accompanying drawings in which.

Figures 1, 2, 3, 4:
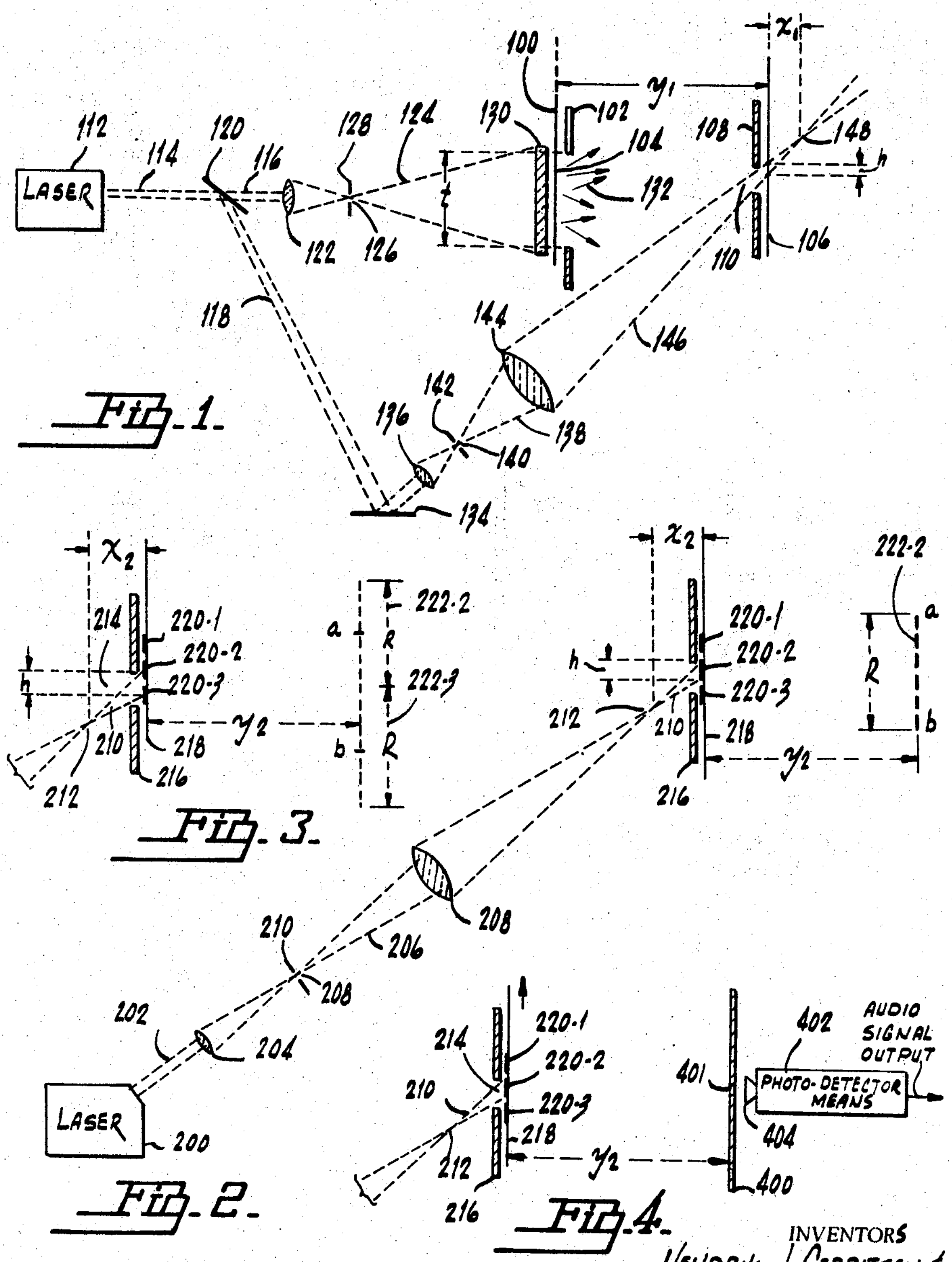
FIG. 1 shows an illustrative embodiment of apparatus for recording micro-holograms in accordance with the principles of the present invention.
FIG. 2 shows an illustrative embodiment of apparatus for reading out a series of recorded micro-holograms in accordance with the principles of the present invention, wherein the recorded series of micro-holograms have a first predetermined orientation with respect to the readout beam.

FIG. 3 shows a first modification of the apparatus shown in FIG. 2, wherein the recorded series of micro-holograms have a second predetermined orientation with respect to the readout beam; and FIG. 4 shows a second modification of the apparatus shown in FIG. 2, further including means for scanning the respective reconstructed images of each of a recorded series of micro-holograms along with photo-detector means for deriving an audio signal output therefrom.

Referring now to FIG. 1, there is shown a portion of a sound track 100 of a thirty-five millimeter motion picture film. In cooperative relationship therewith is mask 102 having an aperture 104 of a size which cooperates with a single thirty-five millimeter frame of sound track 100. At a distance $y_1$ from sound track 100 is recording medium 106, which may be a photographic plate, for instance. In cooperative relationship therewith is mask 108 having a small aperture 110 therein.

Laser 112, for example, a helium-neon laser, produces a beam of spatially coherent monochromatic light 114, which is divided into first component beam 116 and second component beam 118 by beam splitting half mirror 120. First component beam 116 is focused by means of lens 122 into divergent beam 124 having a crossover point 126. In order to keep divergent beam 124 "clean" and eliminate spurious aberrations therefrom, pinhole means 128 may be placed in cooperative relationship with crossover point 126.

Divergent beam 124 impinges upon diffuser 130, which may be opal glass. The diffused light flux emerging from diffuser 130 passes through and is modulated by the portion of the sound track corresponding to one frame transparency of sound track 100 to thereby produce information light flux 132 emerging from aperture 104 of mask 102. As shown in FIG. 1, the size of one frame transparency and the size of aperture 104 is *t*. It will be seen that a portion of information light flux 132 will be effective in exposing that portion of recording medium 106 which is defined by opening 110 in mask 108. As shown in FIG. 1, the size of this portion is *h*, which is much smaller than *t*. If *t* is thirty-five millimeters, *h* will normally be about one millimeter.

Second component beam 118 is reflected from mirror 134 and then is focused by lens 136 into magnified beam 138 having a crossover point 140. Pinhole 140 serves to "clean" beam 138, as described above in connection with pinhole means 128.

Magnified beam 138 impinges upon large aperture lens 144, which is corrected for spherical aberration. Lens 144 is effective in producing therefrom convergent reference beam 146. Convergent reference beam 146, as shown in FIG. 1, is directed through opening 110 in mask 108, which defines the portion of recording medium 106 which is to be exposed. Further, and most important, convergent reference beam 146 has a predetermined degree of convergence such that its effective crossover point 148 is located a distance $x_1$ beyond the plane of recording medium 106, as shown in FIG. 1. This predetermined degree of convergence is chosen so that the ratio of $x_1$ to $y_1$ is at least approximately equal to the ratio of *h* to *t*.

It will be seen that light from convergent reference beam 146 impinging upon that portion of recording medium 106 defined by opening 110 in mask 108 will produce an interference pattern with the information light flux simultaneously arriving at that portion of recording medium 106 defined by opening 110 in mask 108. The specific characteristics of the particular interference pattern obtained, besides being affected by the particular form of the object being recorded, is determined by the predetermined degree of convergence of reference beam 146. Therefore, the use of a convergent reference beam having that particular predetermined degree of convergence discussed above results in the recording of a micro-hologram having a unique type of interference pattern. This unique type of interference pattern has certain unique properties, which are discussed in detail below in connection with FIG. 3.

By using techniques described in detail in co-pending patent application, "Hologram Record Pressings," Ser. No. 509,100, filed Nov. 22, 1965 by Gerritsen et al., and assigned to the same assignee as the present invention, a record, or a record pressing, comprising a series of separate contiguous micro-holograms may be produced. Each of these series of separate micro-holograms may be of the unique type obtained by utilizing a convergent reference beam having the proper predetermined degree of convergence as reference beam 146 of FIG. 1, discussed above.

If each successive one of the recorded series of contiguous micro-holograms corresponds with that sequential portion of sound track 100 associated with each respective successive frame transparency, the entire information in sound track 100 may be stored by the complete set of micro-holograms making up the entire series.

Referring now to FIG. 2, there is shown apparatus for reading out a series of contiguous micro-holograms contained on a record, each of which has been recorded with a convergent reference beam, in the manner described above in connection with FIG. 1. As shown in FIG. 2, laser 200 emits spatially coherent monochromatic light beam 202 which may be the same or different in frequency from that emitted by the laser utilized in recording, for example, laser 112 of FIG. 1. Light beam 202 is focused by means of lens 204 into magnified beam 206 having a crossover point 208. Pinhole means 210, in cooperative relationship with crossover point 208, serves to "clean" beam 206 of aberrations caused by lens 204. Magnified beam 206 is applied to large aperture lens 208, which is corrected for spherical aberrations, to produce divergent readout beam 210 having a crossover at point 212.

As shown in FIG. 2, divergent readout beam 210 is directed through opening 214 in mask 216 to impinge upon that portion of micro-hologram record 218 which is in cooperative relationship with opening 214 in mask 216.

Micro-hologram record 218 has recorded thereon a series of contiguous micro-holograms among which are successive micro-holograms 220–1, 220–2 and 220–3. As shown in FIG. 2, micro-hologram record 218 is oriented with respect to mask 216 so that divergent readout beam 210 is capable of impinging upon solely micro-hologram 220–2. Each of contiguous micro-holograms 220–1, 220–2 and 220–3 have a size equal to *h*. As stated above in connection with FIG. 1, *h* is normally about one millimeter. As further shown in FIG. 2, crossover point 212 of divergent readout beam 210 is located a distance $x_2$ in front of the plane of record 218.

The illumination of micro-hologram 220–2 by divergent readout beam 210 results in a reconstructed image 222–2 of the information contained in micro-hologram 220–2 being formed in a plane parallel to micro-hologram record 218 at a distance $y_2$ therefrom. The size of reconstructed image 222–2 is R and is positioned between points *a* and *b*, as shown in FIG. 2. Divergent readout beam 210 has a predetermined divergence which is chosen such that the ratio of the distance $x_2$ to the distance $y_2$ is at least approximately equal to the ratio between *h* and R, the distance between points *a* and *b*.

FIG. 3 shows a portion of the apparatus shown in FIG. 2, which is modified solely to the extent that the orientation of micro-hologram record 218 with respect to mask 216 in FIG. 3 is such that the lower half of micro-hologram 220–2 and the upper half 220–3 are within cooperative relationship with divergent readout beam 210, rather than this orientation being such that solely micro-hologram 220–2 in its entirety is in cooperative relationship wtih divergent readout beam 210 as is the case in FIG. 2. In all other respects the apparatus in FIG. 3 is identical to that shown in FIG. 2.

As shown in FIG. 3, the illumination of the lower half of micro-hologram 220–2 by divergent readout beam 210, having the aforesaid predetermined degree of divergence, results in the formation of reconstructed image 222–2. In a similar manner the illumination of the upper half of micro-hologram 220–3 by divergent readout beam 210 results in the formation of reconstructed image 222–3. As shown in FIG. 3, the size of reconstructed image 222–2 is R, the same as it was in FIG. 2. Similarly, as shown in FIG. 3, the size of reconstructed image 222–3 is R. However, the position of reconstructed image 222–2 in FIG. 3 does not extend between points *a* and *b* as it did in FIG. 2, but extends from a point midway between points *a* and *b* to a point which extends above point *a* by a distance equal to $R/2$. In a similar manner, reconstructed image 222–3 extends from the point midway between points *a* and *b* to a point which extends below point *b* by a distance equal to $R/2$. It will thus be seen that the reconstructed images 222–2 and 222–3 appear in contiguous non-overlapping relationship with respect to each other, although the size R of each reconstructed image is much larger than the size of its corresponding micro-hologram.

The reason that non-overlapping contiguous reconstructed images, of the type shown in FIG. 3, are obtained is a consequence of the fact that a convergent reference beam having the predetermined divergence discussed above was utilized in recording each of the micro-holograms and that a divergent readout beam having the predetermined degree of convergence discussed above was utilized in reading out each of these so recorded micro-holograms.

When the information light flux utilized in recording a micro-hologram is obtained from diffused light, as is the case in the apparatus shown in FIG. 1, each point of the resulting recorded micro-hologram is capable of reconstructing an image of the entire object which has been recorded, as is well known in the hologram art. It is for this reason that in FIG. 3 the illumination of only the lower half of micro-hologram 220–2 gives rise to an entire reconstructed image 222–2 and the illumination of only the upper half of micro-hologram 220–3 gives rise to an entire reconstructed image 222–3. Of course, the brightness of reconstructed image 222–2 in FIG. 3 will be only half that of reconstructed image 222–2 in FIG. 2, since only half of micro-hologram 220–2 is illuminated in FIG. 3 while all of it is illuminated in FIG. 2.

For many purposes such a change in brightness is undesirable. However, this undesirable change in brightness may be eliminated by the simple expedient of widening opening 214 to permit a set of three micro-holograms, such as 220–1, 220–2 and 220–3, to be simultaneously read out by a wider divergent readout beam 210. In this case, a micro-hologram occupying any position between that occupied by micro-hologram 220–3 in FIG. 2 and that occupied by micro-hologram 220–1 in FIG. 2 will remain fully illuminated by the readout beam, so that no change in brightness will occur.

On the other hand, often the information manifested by each reconstructed micro-hologram is converted into an electrical information signal. In this case, a change in brightness in a moving reconstructed image of a micro-hologram which was recorded with diffused information light flux will cause a spurious low frequency "hum" signal to be produced. However, the frequency of this "hum" signal will usually be below the pass band needed to transmit the information signal and, therefore, can be removed by filtering the converted electrical signal. Thus, in this case, it is not necessary to eliminate the aforesaid change in brightness in the manner described in the previous paragraph.

Although the information light flux utilized to record the micro-holograms in apparatus shown in FIG. 1 is composed of diffused light, which has those effects on the obtained reconstructed image which are discussed in the last paragraph, it is not essential to the present invention that the information light flux be obtained from diffused light. More particularly, when the object is a transparency, it is a practice in the art to either illuminate it with diffused light, in the manner shown in FIG. 1, or, in the alternative, shine a convergent information beam of light therethrough with the recording medium being placed near, but not at, the crossover point of the convergent information beam. A micro-hologram made with diffused light contains redundant information in that each point thereof contains information pertaining to the whole transparency and is therefore sufficient to reconstruct the entire image of the transparency, as is the case in FIG. 3. On the other hand, each separate point of a micro-hologram made with a convergent information beam contains information about a different distinct point on the transparency and is therefore sufficient to reconstruct solely that point of the image of the transparency.

If each of micro-holograms 220–1, 220–2 and 220–3 were made with a convergent reference beam, in accordance with the principles of the present invention, and were also made with a convergent information beam, rather than with diffused light flux, then the illumination of only the lower half of micro-hologram 220–2 would result in the reconstructed image of only the lower half of the object recorded in micro-hologram 220–2. In this case, reconstructed image 222–2 would extend only from the midpoint between points *a* and *b* to point *a* and would not extend above point *a*. In a similar manner, reconstructed image 222–3 would extend only from the midpoint between points *a* and *b* to point *b* and would not extend below point *b*. However, in accordance with the present invention, even if a convergent information beam, rather than diffused light, is utilized for recording reconstructed images 222–2 and 222–3 will still appear in non-overlapping contiguous relationship with respect to each other, so long as the reference beam utilized for recording has the proper convergence and the readout beam has the proper divergence.

In general, in accordance with the principles of the present invention and regardless of whether diffused light or a convergent beam was utilized as the information light flux in recording each of a series of micro-holograms, translational relative movement of adjacent ones of a series of contiguous separate micro-holograms in a transverse direction with respect to a readout beam results in the appearance of respective reconstructed images corresponding to these adjacent micro-holograms which move in position with respect to the readout beam in a manner such that the respective reconstructed images are in non-overlapping contiguous relationship with respect to each other while moving in position. All that is required is that the reference beam utilized in recording each of the micro-holograms have the proper degree of convergence, and that the readout beam have the proper degree of divergence. More particularly, as set forth above, the proper degree of convergence for the reference beam is such that that the ratio of $x_1$ to $y_1$, in FIG. 1 is equal to the ratio between *h* to *t*. The proper degree of divergence for the readout beam is such that the ratio of $x_2$ to $y_2$ is equal to the ratio of *h* to R. If this is true, the desired non-overlapping contiguous relationship in moving reconstructed images will be maintained.

Referring now to FIG. 4, there is shown a modification of FIG. 2, wherein all elements in FIG. 4 which are identical in structure and formation to those shown in FIG. 2 are identified by the same reference numerals.

In FIG. 4, a mask 400 having a very narrow slit 401 therein is placed in the reconstructed image plane. Behind mask 400 is photo-detector means 402 having a photocell 404 located in cooperative relationship with slit 401. As shown by the arrow, micro-hologram record 218 with its micro-holograms 220–1, 220–2 and 230–3 is translationally moved across divergent readout beam 210. This results in moving non-overlapping contiguous reconstructed images being formed in the image plane occupied by mask 400, for the reasons discussed above in detail. Slit 401 in mask 400 serves to sequentially scan each successive reconstructed image in its direction of motion. The varying light intensity from the portion of each reconstructed image passing slit 401 at each instant illuminates photocell 404 and is detected by photo-detector means 402 to produce an output signal. If, as has been assumed, the information in each micro-hologram pertains to a successive portion of a motion picture sound track, the signal output from photo-detector means 402 will be a continuous audio signal of the sound originally stored on the sound track. Since there is no overlap or hiatus between successive reconstructed images, the audio signal output of photo-detector means 402 is capable of reproducing with fidelity the original sound stored on the track.

Thus, the present invention may be utilized for recording by holographic techniques the sound portion of a motion picture along with the picture portion to provide a complete record of a talking motion picture. Obviously, it may also be utilized to record solely sound information to thereby provide records equivalent to phonograph records. In this case, a bandwidth of the order of twenty kilocycles is feasible with a linear playback speed of a micro-hologram record of about only one inch per second, due to the very high information storage intensity of which micro-hologram records are capable. Thus, it is possible to realize a playing time of the order of at least several hours on one side of a 12-inch diameter micro-hologram record, which is capable of reproducing music with good fidelity.

In addition to audio information, the present invention is useful in recording in hologram form any information in sequential form. Further, reflective micro-hologram records, such as disclosed in the above-mentioned co-pending Gerritsen et al. patent application, may be substituted for the transmission type of micro-hologram records disclosed herein. Therefore, although only illustrative embodiments of the present invention are disclosed herein, it is not intended that the present invention be restricted hereto, but that it be limited only by the true spirit and scope of the appended claims.

Since a convergent or divergent crossover point may be either vertical or real, the term "effective crossover point" is used in the claims to cover both.

What is claimed is:

1. In combination, a medium having recorded thereon a series of contiguous, non-overlapping micro-holograms of respective objects, each of said micro-holograms being composed of and characterized by that particular type of interference fringe pattern which results from the interference between an object-coded information component of coherent wave energy of a first given wavelength and a reference beam of said coherent wave energy having a first predetermined degree of convergence and traveling substantially in a first given direction with respect to said medium, and readout beam means effective while said medium is moving for continuously illuminating in turn each respective one of said series of contiguous micro-holograms with a readout beam of wave energy having a given cross section and traveling substantially in a second given direction with respect to said medium which is opposite to said first given direction, said given cross section having a dimension substantially equal in size to that of a micro-hologram in a direction parallel to the motion of said medium with respect to said readout beam, said readout beam having a second given wavelength and a second predetermined degree of divergence which results in contiguous non-overlapping reconstructed images of given size of said respective objects manifested by adjacent ones of said series of micro-holograms being continuously produced as said micro-holograms are continuously moved with said medium in a transverse direction with respect to said readout beam, said given size of a reconstructed image being many times the size of each of the micro-holograms being read out.

2. The combination defined in claim 1 wherein said second given wavelength is equal to said first given wavelength, whereby said second predetermined degree of the divergence of said readout beam is equal to said first predetermined degree of the convergence of said reference beam.

3. The combination defined in claim 1, wherein said second predetermined degree of divergence of said readout beam is chosen such that the distance from the effective crossover point of said divergent readout beam from said micro-hologram being read out is substantially equal to the distance from said micro-hologram being read out to said reconstructed image multiplied by the ratio between corresponding dimensions of the micro-hologram being read out and the reconstructed image of the micro-hologram being read out.

References Cited

UNITED STATES PATENTS 3,191,490 6/1965 Rabinow ---------- 88—1(OS)

OTHER REFERENCES

"Attainment of High Resolutions in Holography by Multi-Directional Illumination and Moving Scatters" G. W. Stroke and D. G. Falconner, Physics Letters, vol. 15, No. 3, Apr. 1, 1965, pp. 238–240.

"How To Make Laser Holograms," Keith S. Pennington, Microwaves, October 1965, pp. 35–40.

"Microscopy by Wavefront Reconstruction" by Leith, Upatinieks, Hanes, J.O.S.A. vol. 55, No. 8, August 1965, pp. 981–986.

DAVID SCHONBERG, Primary Examiner

M. J. TOKAR, Assistant Examiner